J. J. McGUIRE.
CONVERTIBLE AUTOMOBILE BODY.
APPLICATION FILED MAY 5, 1919.

1,344,546.

Patented June 22, 1920.
4 SHEETS—SHEET 1.

WITNESSES
H. C. Hebig
Rev. J. Hostir

INVENTOR
JOHN J. McGUIRE
BY Munn & Co.
ATTORNEYS

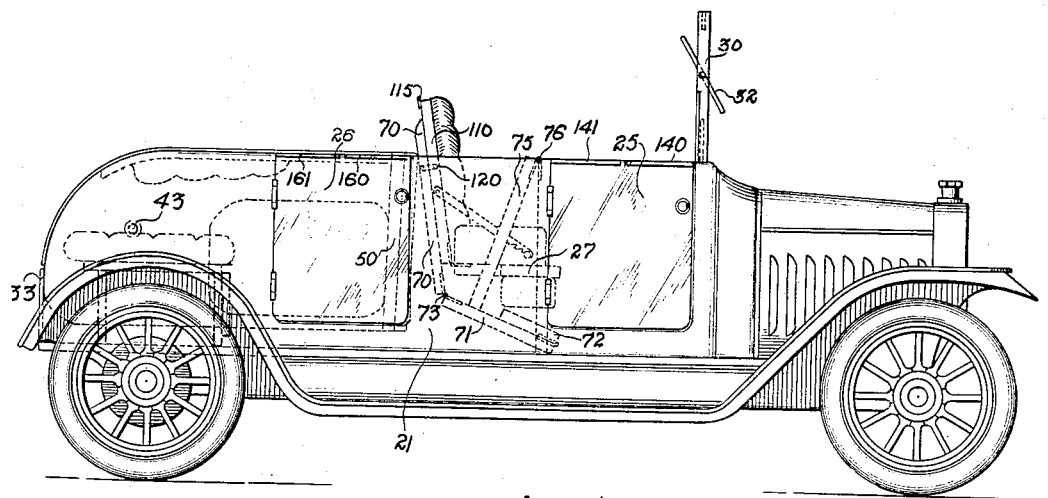
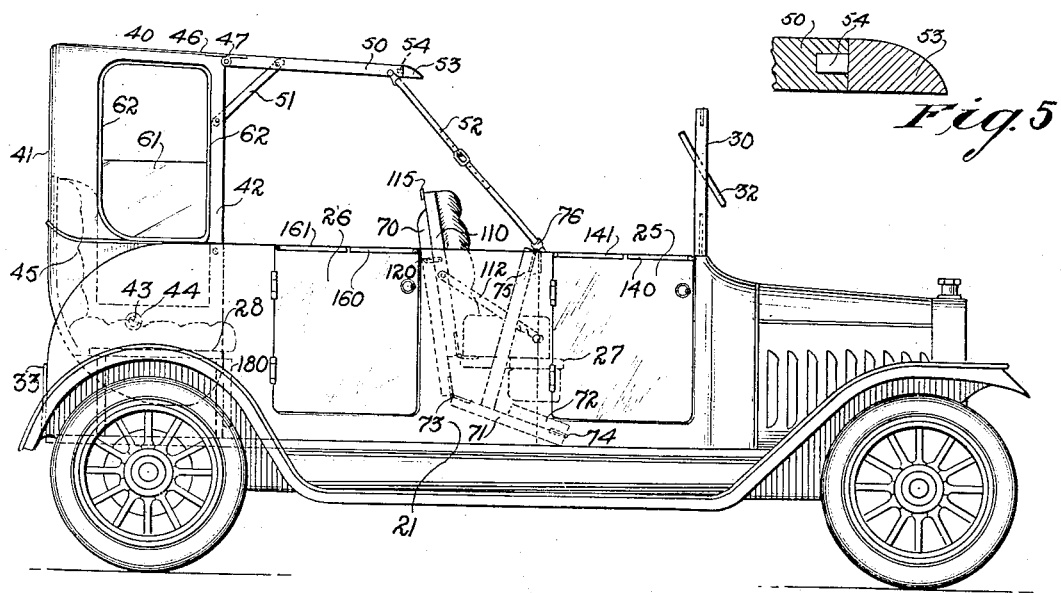
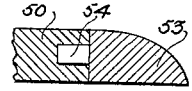

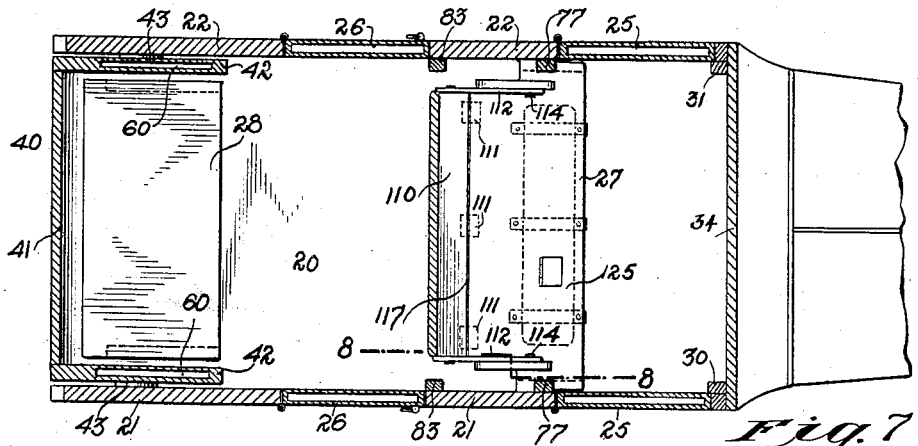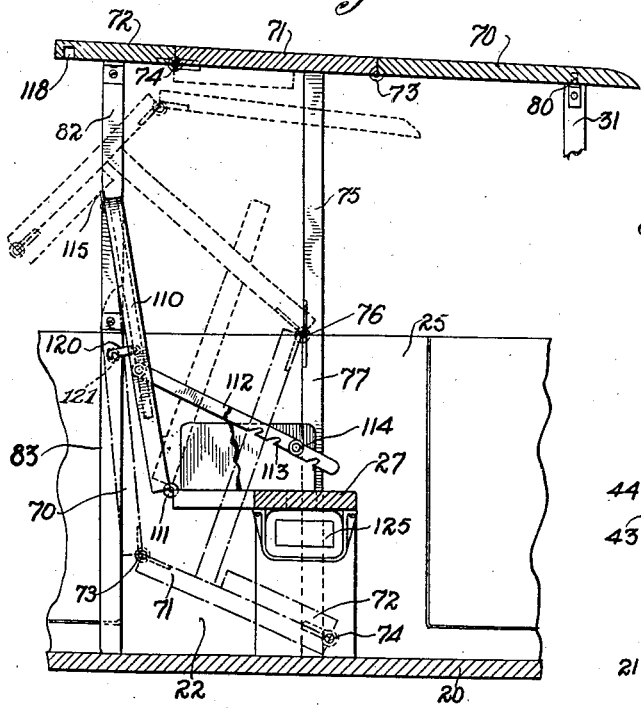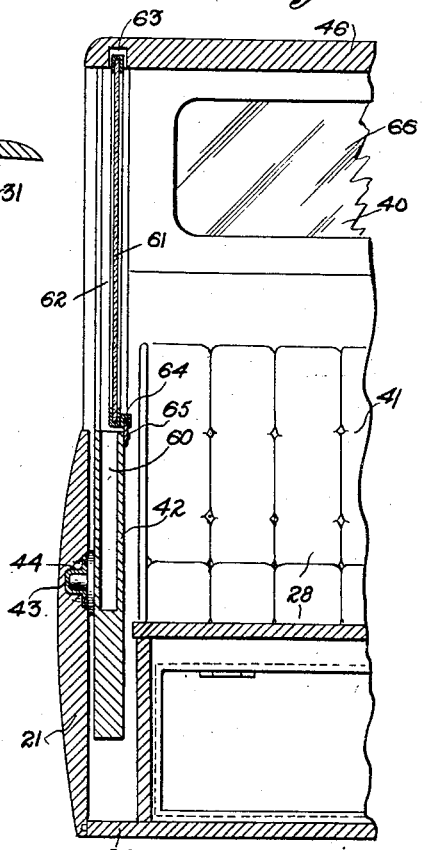

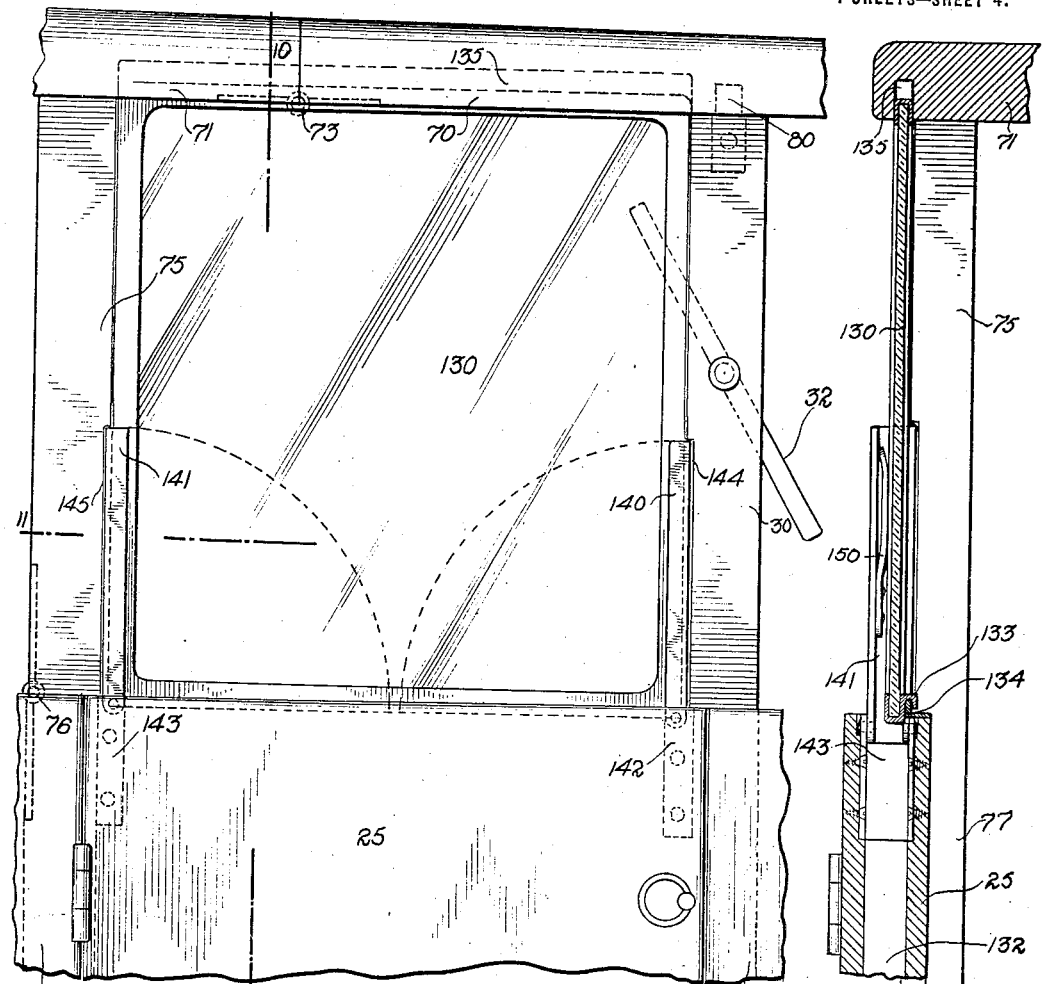
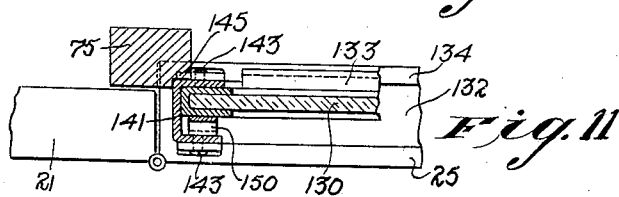
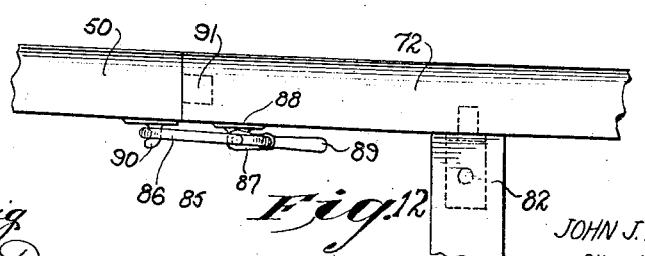

UNITED STATES PATENT OFFICE.

JOHN J. McGUIRE, OF YONKERS, NEW YORK.

CONVERTIBLE AUTOMOBILE-BODY.

1,344,546.  Specification of Letters Patent.  Patented June 22, 1920.

Application filed May 5, 1919. Serial No. 294,790.

*To all whom it may concern:*

Be it known that I, JOHN J. McGUIRE, a citizen of the United States, and a resident of Yonkers, in the county of Westchester and State of New York, have invented a new and Improved Convertible Automobile-Body, of which the following is a full, clear, and exact description.

The object of the invention is to provide a new and improved convertible automobile body arranged to permit of converting it into a limousine, runabout, an open car body or a partly open car body. Another object is to permit of providing sleeping accommodation in the limousine body.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 3 is a similar view of the same with the car body converted to provide a roadster;

Fig. 4 is a similar view of the same with the car body converted to provide an open sedan;

Fig. 5 is an enlarged sectional side elevation of the front end of the extension roof of the coupé-like superstructure shown in Fig. 4;

Fig. 6 is a sectional plan view of the convertible automobile body on the line 6—6 of Fig. 1;

Fig. 7 is an enlarged cross section of the same on the line 7—7 of Fig. 1;

Fig. 8 is an enlarged sectional side elevation of a portion of the automobile body at the front seat, the section being on the line 8—8 of Fig. 6;

Fig. 9 is an enlarged side elevation of the front door portion of the automobile body;

Fig. 10 is a cross section of the same on the line 10—10 of Fig. 9;

Fig. 11 is a sectional plan view of the same on the line 11—11 of Fig. 9; and

Fig. 12 is a side elevation of the locking connection between the adjacent roof sections.

Figure 1:
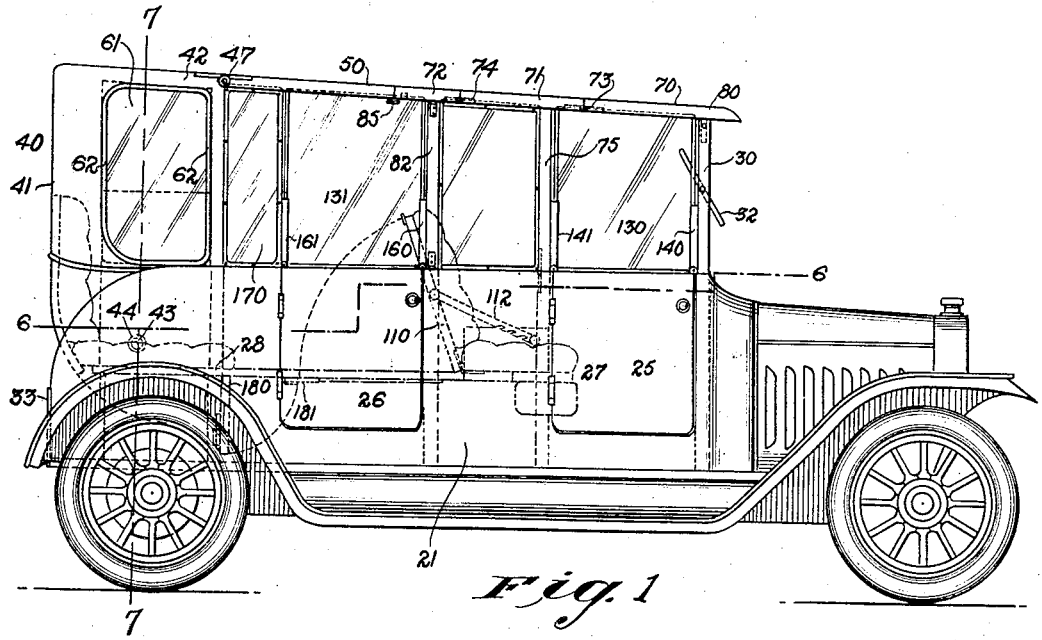
Figure 1 is a side elevation of an automobile provided with a limousine body.

The main body of the automobile body comprises a floor 20, sides 21 and 22 permanently fastened to the floor 20 and provided with front and rear doors 25 and 26 mounted to swing open and closed in the usual manner. Within the main body adjacent the doors 25 and 26 are arranged front and rear seats 27 and 28 supported from the floor 20. The sides of the front seat 27 are also preferably connected with the sides 21 and 22 of the main body, as indicated in Fig. 6, but the sides of the rear seat 28 are spaced from the sides 21 and 22, as shown in Figs. 6 and 7, to provide a space between the sides of the seat and the sides 21 and 22 for the purpose hereinafter more fully explained. The front of the main body is provided with windshield posts 30, 31 in which is mounted to swing in the usual manner the wind shield 32, the said posts 30 and 31 being arranged on the inner faces of the sides 21 and 22, as shown in Fig. 6. A tailboard 33 extends across the rear end of the floor 20 and connects the rear ends of the sides 21 and 22 with each other, and a dashboard 34 extends across the front of the main body in the usual manner.

Figure 2:
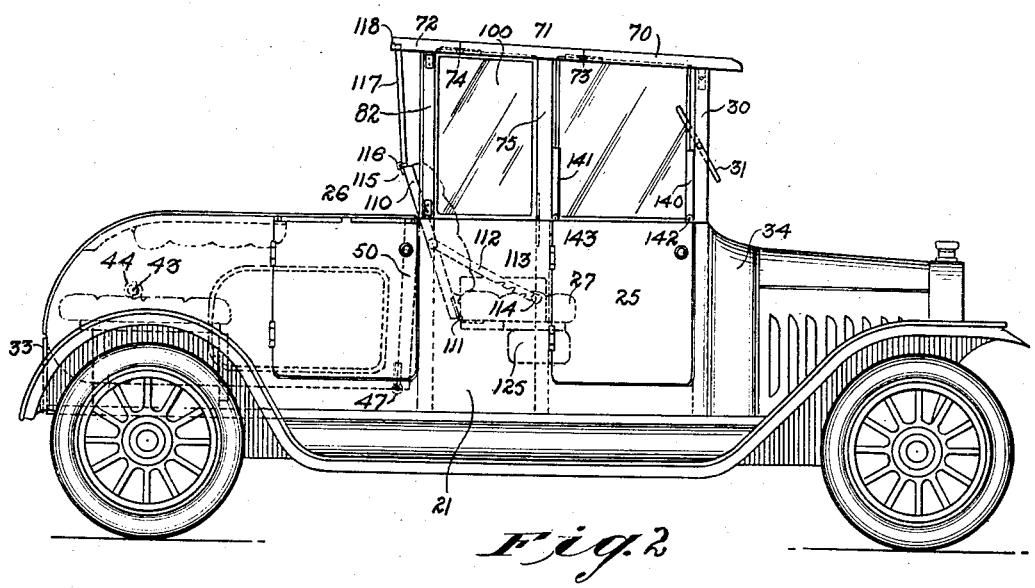
Fig. 2 is a similar view of the same with the body converted to provide a runabout.

On the rear portion of the main body is mounted a coupé-like superstructure 40 comprising a back 41 and sides 42 provided with trunnions or pivots 43 journaled in bearings 44 attached to the inner faces of the sides 21 and 22 to permit of swinging the coupé-like superstructure 40 from normal vertical position, as illustrated in Figs. 1, 4, 6 and 7, downward and forward into a folded position within the main body, as illustrated in Figs. 2 and 3. The lower portion of the back 41 and the sides 42 is rounded off, and the rear ends of the sides 21 and 22 are similarly rounded off so that when the superstructure 40 is swung into folded position then the said rounded-off portions are flush as will be readily understood by reference to Figs. 2 and 3, thereby giving a neat appearance to the car and at the same time the back 41 of the coupé-like superstructure 40 forms a cover for the rear portion of the main body. By reference to Figs. 1, 4, 6 and 7 it will be seen that the back 41 of the superstructure 40 provides a support for the cushions 45 forming the back for the rear seat 28. The back 41 and the sides 42 of the superstructures support an integral roof 46, to the forward end of which is attached by hinges 47 an extension roof 50 held in an approximately horizontal position by suitable side braces 51 pivotally connecting the sides of the roof extension 50 with the sides 42 of the superstructure. The forward end of the extension roof 50 is connected by forwardly and downwardly extending detachable side straps 52 with the sides 21 and 22 adjacent the rear end of the front doors 25. In order to give a desirable finish to the front end of the extension roof 50 use is made of a trimming or molding 53 detachably connected by dowel pins 54 with the front end of the roof extension 50, as plainly indicated in Figs. 4 and 5. It is understood that when it is desired to fold the superstructure 40 into the main body, the straps 52 and the molding 53 are detached and the braces 51 are disconnected from the sides 42 to allow of swinging the extension roof 50 onto the roof 46 of the superstructure to fold with the latter into the main body, as indicated in Figs. 2 and 3.

The lower portions of the sides 42 are provided with recesses 60 into which are adapted to pass the lower portions of glass panels 61 mounted to slide at the sides in suitable guideways 62 (see Fig. 7) formed on the sides 42. The upper ends of the panel 61 are adapted to pass into grooves 63 formed in the under side of the roof 46 of the coupé-like superstructure 40, as plainly shown in Fig. 7. The lower end of each panel 61 is provided with a hook 64 adapted to hook onto a rail 65 attached to the inner face of the corresponding side 42 of the superstructure 40 to support the panel 61 in uppermost position, as shown in Figs. 1 and 7. The panel 61 can be partly lowered into the recess 60 whenever it is desired to do so as indicated in Fig. 4. The back 41 of the superstructure 40 is preferably provided in its upper portion with the usual window 66, preferably of a diaphanous flexible material (see Fig. 7).

A superstructure for the forward portion of the main body is provided for use when converting the body into a limousine, as shown in Fig. 1, or into a runabout, as shown in Fig. 2, in which latter case the rear coupé-like structure 40 is folded within the main body, as previously explained. The forward superstructure comprises a roof made in sections 70, 71 and 72 connected with each other by hinges 73 and 74, and of which the middle section 71 is rigidly mounted on posts 75 pivotally connected at their lower ends by hinges 76 to posts 77 attached to the inner faces of the sides 21 and 22 of the main body, the posts 77 being at the sides of the front seat 27 immediately in the rear of the front doors. The front roof section 70 engages pins 80 held on top of the windshield posts 30, 31, thus supporting the said front roof section 30. The rear roof section 72 is supported on detachable posts 82 detachably connected with posts 83 arranged on the inner faces of the sides 21 and 22. The posts 83 are located immediately forward of the rear doors 26. The rear end of the rear roof section 72 is adapted to join the forward end of the extension roof 50, and the two roof sections 50 and 72 when in use are locked together by a suitable locking device 85, such as shown, for instance, in Fig. 12, and which consists essentially of a link 86 pivoted at 87 on a bracket 88 attached to the under side of the roof section 72. The link 86 is provided with a suitable handle 89 and is adapted to engage at its free end a keeper 90 attached to the under side of the roof 50 at the forward end thereof. Dowel pins 91 may also be used for connecting the adjacent ends of the roof 50 and roof sections 72 with each other. Glass panels 100 are removably fitted into the space between the posts 75, 82, the tops of the sides 21, 22 and the roof sections 71, 72, as plainly shown in Figs. 1 and 2. These panels are detached and removed whenever it is desired to fold the front superstructure.

In order to provide a back for this front superstructure, the following arrangement is made: The front seat 27 is provided with a back 110 connected at its lower end by hinges 111 to the rear end of the front seat 27. The sides of the back 110 are provided with links 112 having notches 113, one of which engages a corresponding pin 114 attached to the corresponding side of the seat 27, as plainly shown in Fig. 8. By the arrangement described the back 110 can be more or less inclined rearwardly and upwardly to suit the convenience of the user, and the said back 110 can be swung forwardly into the position shown in dotted lines in Fig. 8, whenever it is desired to fold the front superstructure under the seat 27, as indicated in dotted lines in Figs. 3, 4 and 8. The top of the back 110 is provided with a transversely extending rail 115 adapted to be engaged by a hook 116 formed on the lower end of a transverse panel 117 fitting with its upper end into a transverse groove 118 formed in the under side of the rear roof section 72 at the rear end thereof (see Figs. 2 and 8). This panel 117 can be readily lifted out of position and placed into the back 110 which is recessed or made hollow for that purpose. In order to fold the front superstructure, the posts 82 are detached and the panels 117 and 100 are removed, then the front roof section 70 is disengaged from the posts 30, 31 and the back 110 is swung forwardly to the position shown in dotted lines in Fig. 8 to allow of swinging the posts 75 downward and rearward to swing the middle roof section 71 under the seat 27 with the rear roof section 72 folded under the middle roof section 71 and with the front roof section 70 extending upwardly in the rear of the back 110 which can now be swung back into its normal rearmost position, as indicated in Fig. 8. A suitable latch 120 pivoted to the inner face of each side 22 of the main body and engaging a pin 121 on the corresponding side of the front roof section 70 serves to hold the latter in the folded position indicated in dotted lines in Fig. 8. A gasolene tank 125 is preferably located or attached to the under side of the front seat 27, as indicated in the drawings.

In order to provide a closed limousine or roadster use is made of glass panels 130 and 131 for the doors 25 and 26. Each glass panel 130 is adapted to be lowered into a recess 132 formed in the corresponding front door 25, and the lower end of each glass panel 130 is provided with a hook 133 adapted to hook onto a rail 134 attached to the top of the door 25 at the inner portion thereof, as plainly indicated in Figs. 10 and 11. The upper end of each panel 130 is adapted to extend into a longitudinally extending groove 135 formed in the roof sections 70 and 71, and the sides of the panel 130 fit against the posts 30 and 75 at the time said panel is in an uppermost closed position. In order to securely hold each panel 130 in position when raised use is made of two guideways 140, 141 pivoted on brackets 142 and 143 attached to the upper corners of the corresponding front door 25. The guideways 140 fit into cut-out portions 144 and 145 formed in the lower portions of the posts 30 and 75, as plainly shown in Fig. 9. When the panel 130 is in lowermost position, that is, folded within the corresponding recess 132 in the door 25 then the guideways 140 and 141 are swung downward onto the top of the doors 25 to close the upper ends of the recesses 132. In order to prevent rattling of the panels 130 when in raised position use is made of latch springs 150 held within the guideways 140 and 141 and bearing against the outer faces of the sides of the panel, as will be readily understood by reference to Figs. 10 and 11.

The panel 131 is similarly mounted relative to the door 26 provided with guideways 160 and 161 corresponding to the guideways 140 and 141. Each of the panels 131 is supported on the door 26 by a hook and rail, the same as above described relative to the hook and rail 133 and 134, and the upper end of the panel 131 fits into a groove formed in the under side of the extension roof 50 and the rear roof section 72. A glass panel 170 is provided for each side of the car body and detachably fits into the space between the front of each side 42 of the rear superstructure 40 and the corresponding guideway 161 on the left hand side of the panel 131 with the bottom of the panel 170 flush with the corresponding top of the side 21 or 22 and with the upper end fitting into a groove on the under side of the extension roof 50, as will be readily understood by reference to Fig. 1.

In order to provide sleeping accommodations when the automobile is converted into a limousine, the back 110 of the front seat 27 is swung rearwardly and downwardly into horizontal position, and a front drop board 180 pivoted on the front end of the rear seat 28 is swung upward to join the rear end of the back 110 when in lowermost position thus providing a continuous support consisting of the front seat 27, back 110, drop board 180 and the rear seat 28. Suitable fastening devices such as bolts and keepers 181 serve to fasten the free end of the drop board 180 to the rear end of the back 110, as indicated in Fig. 1.

When a limousine body is desired, the front and rear superstructures are erected and connected with each other, as shown in Fig. 1, and the panels 100 and 170 are fastened in place and the glass panels 130 and 131 of the doors 25 and 26 are moved into uppermost closed position. The panel 117 may be placed in position if desired to provide separated front and rear compartments, access to which is had by way of the doors 25 and 26, respectively.

When it is desired to convert the automobile into a runabout, as shown in Fig. 2, then the panels 170 are first removed and the rear superstructure 40 with its extension roof 50 is folded into the main body, as previously described. In this case the panel 117 is used to provide a closed back for the front superstructure.

When it is desired to use the automobile as a roadster, the front superstructure is also folded into the main body, as shown in Fig. 3 and as previously described.

When it is desired to use the automobile as an open sedan, as shown in Fig. 4, then the front superstructure is folded into the main body while the rear superstructure 40 is in extended position with the extension roof 50 supported by the braces 51 and held in place by the straps 52.

From the foregoing it will be seen that by the arrangement described the automobile body can be quickly changed from one type to another without requiring the aid of skilled labor and the various parts are always in position for readily making the desired changes.

It is understood that I do not limit myself to the minute details shown and described as the same can be varied without deviating from the spirit of my invention.

Having thus described my invention, I claim as new and desire to secure by Letters Patent:—

1. In a convertible automobile body, a main body having side walls extending substantially the length of said body and provided with front and rear doors, fixed front and rear seats in said body, and a rigid coupé-like superstructure comprising side and rear walls and a top, extending above said body between the side walls thereof and having the side walls of said superstructure pivoted to the side walls of said body adjacent the rear end thereof, so that said superstructure is adapted to fold downwardly within said main body between the side walls thereof, the said superstructure forming the back for the rear seat.

2. In a convertible automobile body, a main body provided with front and rear doors and having fixed front and rear seats, a windshield, a coupé-like superstructure pivoted on the rear of the said main body and adapted to fold forwardly and downwardly within the main body to form a cover for the rear portion of the said main body up to the front seat, and a front superstructure extending over the front seat and adapted to fold into the said main body, the rear of the front superstructure being joined with the said coupé-like superstructure and with the said windshield.

3. In a convertible automobile body, a main body having a front door and a front seat provided with a hinged back, a windshield having posts fixed on the said main body, and an inclosing superstructure for the said main body at the front seat, the said superstructure having a roof made in middle, front and rear sections pivotally connected with each other, posts rigidly connected with the said middle roof section and pivoted on the sides of the said main body, posts detachably connecting the rear roof section with the sides of the main body, a back panel detachably connecting the back of the said front seat with the said rear roof section, and a connection connecting the front roof section with the posts of the windshield.

4. In a convertible automobile body, a main body having a front door and a front seat provided with a hinged back, a windshield having posts fixed on the said main body and an inclosing superstructure for the said main body at the front seat, the said superstructure having a roof made in middle, front and rear sections pivotally connected with each other, posts rigidly connected with the said middle roof section and pivoted on the sides of the said main body, posts detachably connecting the rear roof section with the sides of the main body, a back panel detachably connecting the back of the said front seat with the said rear roof section, a connection connecting the front roof section with the posts of the windshield, and a recess in said seat and adapted to receive the said back panel.

5. In a convertible automobile body, a main body having a front door and a front seat provided with a hinged back, a windshield having posts fixed on the said main body and an inclosing superstructure for the said main body at the front seat, the said superstructure having a roof made in middle, front and rear sections pivotally connected with each other, posts rigidly connected with the said middle roof section and pivoted on the sides of the said main body, posts detachably connecting the rear roof section with the sides of the main body, a back panel detachably connecting the back of the said front seat with the said rear roof section, a connection connecting the front roof section with the posts of the windshield, and removable glass sides fitting between the said posts, the sides of the said main body and the roof of the superstructure.

6. In a convertible automobile body, a main body provided with front and rear doors and having front and rear seats and a coupé-like superstructure pivoted on the rear of the said main body and adapted to fold therein, the said superstructure forming the back for the rear seat, an extension roof pivoted on the front end of the roof of the said coupé-like superstructure and extending over the space between the front and rear seats, side braces connecting the said extension roof with the sides of the said superstructure, and forwardly and downwardly extending straps connecting the forward end of the said extension roof with the sides of the main body adjacent the front seat.

7. In a convertible automobile body, a front seat, a hinged back for the said front seat, means for supporting said hinged back in adjusted positions, a roof above the said seat and a removable panel detachably connected at the opposite ends with the top of the said seat back and with the said roof, whereby said panel may be completely removed from said body when desired.

8. In a convertible automobile body, a front seat, a hinged back for the said front seat, means for supporting said hinged back in adjusted positions, a roof above the said seat, and a removable panel connecting the top of the said seat back with the said roof, the said panel having a hook and the top of the said seat back having a rail engaged by the said hook, the said roof having in its under side a transversely extending groove engaged by the top of the said panel.

9. In a convertible automobile body, a main body having front and rear doors in its sides, front and rear seats mounted in the said main body, windshield posts seated at the front of the said main body, a windshield mounted on the said windshield posts, a coupé-like superstructure pivoted at the rear of the said main body and normally providing an inclosure for the rear seat, the said coupé-like superstructure being adapted to fold into the said main body, posts hinged to the sides of the main body and the rear of the front doors, posts removably mounted on the sides of the main body at the front ends of the rear doors, panels removably mounted between the said hinged and removable posts, sliding side panels on the said doors, a front roof having a middle section, a rear section and front section, the said roof sections being pivotally connected with each other, the front end of the front roof section resting on the said wind shield posts, the said middle roof section forming an integral part of the said hinged posts and the said rear roof section being detachably connected with the said detachable posts, an extension roof section on the forward end of the roof of the said coupé-like superstructure and joining the said rear roof section, and means detachably fastening the said extension roof section and the said rear roof section together.

10. In a convertible automobile, a main body having front and rear doors in its sides, front and rear seats mounted in the said main body, windshield posts erected at the front of the said main body, a windshield mounted on the said windshield posts, a coupé-like superstructure pivoted at the rear of the said main body and normally providing an inclosure for the rear seat, the said coupé-like superstructure being adapted to fold into the said main body, posts hinged to the sides of the main body and the rear of the front doors, posts removably mounted on the sides of the main body at the front ends of the rear doors, panels removably mounted between the said hinged and removable posts, sliding side panels on the said doors, a front roof having a middle section, the said roof sections being pivotally connected with each other, the front end of the front roof section resting on the said windshield posts, the said middle roof section forming an integral part of the said hinged posts and the said rear section being detachably connected with the said detachable posts, an extension roof section on the forward end of the roof of the said coupé-like superstructure and joining the said rear roof section, means detachably fastening the said extension roof section and the said rear roof section, and removable panels mounted on the sides of the main body and the extension roof section between the sides of the coupé-like superstructure and the rear of the panels of the rear doors.

11. In a convertible automobile body, a main body provided with front and rear doors and front and rear seats, a front superstructure for the front portion of the said main body and adapted to fold under the front seat, and a rear superstructure adapted to fold into the rear portion of said main body and forming a cover for the said rear portion.

12. In a convertible automobile body, a main body provided with front and rear doors and front and rear seats, a front superstructure for the front portion of the said main body and adapted to fold under the front seat, and a rear superstructure adapted to fold into the rear portion of the said main body and forming a cover for the said rear portion, the said front and rear superstructures when in extended and connected position forming a unitary structure extending over the whole of the said main body.

13. In a convertible automobile body, a main body having side walls extending substantially the length of said body and provided with front and rear doors, fixed front and rear seats in said body, and a rigid coupé-like superstructure comprising side and rear walls and a top overlying the upper ends of said walls, extending above said body between the side walls thereof and having the side walls of said superstructure pivoted to the side walls of said body adjacent the rear end thereof, so that said superstructure is adapted to fold forwardly and downwardly between the side walls of said body with the top of said superstructure in rear of the back of the front seat of said body and the rear wall of said superstructure forming a cover over the rear portion of the side walls of the said main body up to the front seat.

14. In a convertible automobile body, a main body having front and rear seats and a coupé-like superstructure pivoted at its sides on the sides of the said main body near the rear end thereof, the said superstructure having sides, a back and a roof, an extension roof pivoted on the forward end of the roof of the said superstructure, and links connecting the extension roof with the sides of the superstructure.

15. In a convertible automobile body, a main body having front and rear seats and a coupé-like superstructure pivoted at its sides on the sides of the said main body near the rear end thereof, the said superstructure having sides, a back and a roof, an extension roof pivoted on the forward end of the roof of the said superstructure, links connecting the extension roof with the sides of the superstructure, and detachable straps connecting the forward end of the extension roof with the sides of the main body.

JOHN J. McGUIRE.